United States Patent [19]

Yonke

[11] Patent Number: 4,962,575

[45] Date of Patent: Oct. 16, 1990

[54] HAND POSITIONING DEVICE

[76] Inventor: Bernard A. Yonke, 205 Prospect Ave., Pewaukee, Wis. 53072

[21] Appl. No.: 232,213

[22] Filed: Aug. 15, 1988

[51] Int. Cl.[5] .................... A01N 1/00

[52] U.S. Cl. .................... 27/21.1; 24/136 R

[58] Field of Search .................... 128/878, 879, 77, 876; 27/21.1, 1; 269/328; 70/15, 16, 17; 24/136 R

[56] References Cited

U.S. PATENT DOCUMENTS

| | | | |
|---|---|---|---|
| 2,520,710 | 8/1950 | Brown | 128/876 |
| 2,782,783 | 2/1957 | Gay | 128/874 |
| 3,084,686 | 4/1963 | Perconti | 128/879 |
| 3,766,610 | 10/1973 | Thorsbakken | 24/136 R |
| 3,965,544 | 6/1976 | Boden | 24/136 R |
| 4,414,720 | 11/1983 | Crooms | 27/21 |
| 4,418,900 | 12/1983 | Ricke | 269/45 |
| 4,688,564 | 8/1987 | Kelly | 128/878 |

FOREIGN PATENT DOCUMENTS

| | | | |
|---|---|---|---|
| 483109 | 5/1917 | France | 70/15 UX |

*Primary Examiner*—Robert A. Hafer
*Assistant Examiner*—Kerry Owens
*Attorney, Agent, or Firm*—Willis B. Swartwout, III

[57] ABSTRACT

The present invention is a hand position securing device for use by morticians when embalming and positioning a body for display in a casket. The device consists of a wristlet in the form of an elongated material strip provided with an aperture and grommet therefore to secure a cord to the wristlet strip. One side of the wristlet strip is provided with female joining material and the other side of the strip is provided with male joining material so that the wrist of the body may be encircled with the wristlet. The two wrists having been thus bound can be joined in a fashion that will not show when the body is clothed by lacing the cords together. It is then impossible for the hands to depart from the desired folded position of composure as the result of the force of gravity and/or vibration from movement.

1 Claim, 2 Drawing Sheets

FIG.1
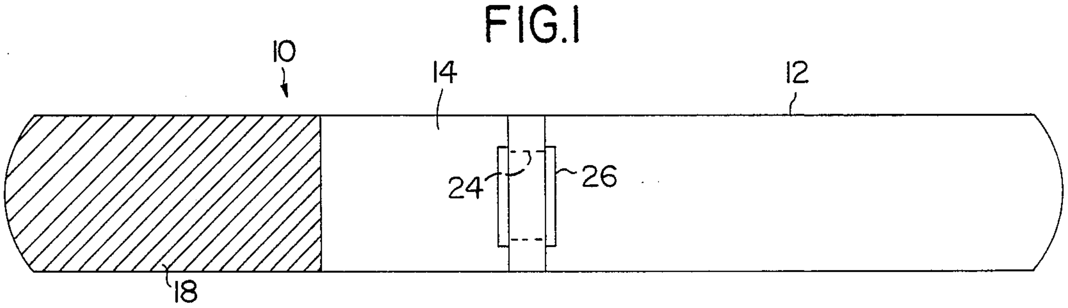
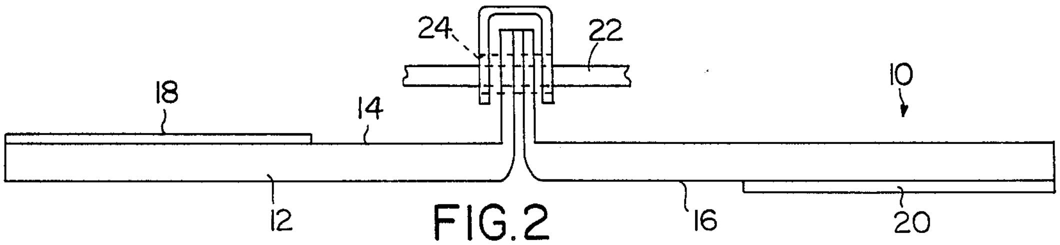
FIG.2
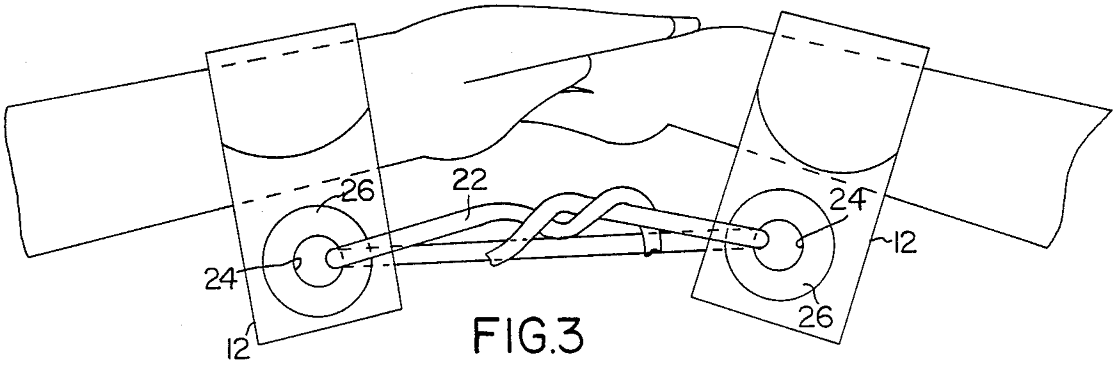
FIG.3

HAND POSITIONING DEVICE

BACKGROUND OF THE INVENTION

The present invention relates to devices to position inert parts of the anatomy of the human body, in particular to devices for morticians to use in the embalming process to position the hands of a corpse in the position of repose or serenity that is customary for a body that is "laid out" for an open casket funeral.

In the past when bodies in the process of being embalmed were very obese the mortician would have a great deal of difficulty getting the hands to remain in the position of serenity or repose that is customary and desirable for the next of kin. The force of gravity, as well as vibration from movement of the casket would cause the hands to fall to the sides of the body instead of remaining folded. In some cases this activity made family members falsely believe that the deceased was not dead and react in panic.

Some morticians in the past have attempted to overcome the problem by stitching the palm of one hand to the back of the other. Although this accomplished the desired result this is no longer considered ethical or proper practice. Other practices such as wiring the hands in position were tried and either were not successful in accomplishing the desired result or if successful could be easily detected by persons standing next to the body while it was lying in the casket.

SUMMARY OF THE INVENTION

The present invention proposes to overcome the problems of and objections to the prior art by providing a hand positioning and securing device comprising a pair of wrist strips, having a cord attached to each and adapted to be wrapped around the wrist of a human body such that the hands can be drawn into and held in a desired position of serenity and repose by the cords securing the position, and the device to be covered by the clothing on the body.

It is another object of the present invention to provide in a device of the character described wrist strips, each provided with male joining material on one side and female joining material on the other side such that they may be adjustably wrapped and usable oh wrists of varying thicknesses.

A further object of the present invention is to provide in a device of the character described an aperture adjacent one end of each wrist strip having a grommet to protect the aperture edges against tearing, the protected aperture of each wrist strip provided with cording for securing the hands in a desired position when the strip is in position on the wrist.

It is yet another object of the present invention to provide in a device of the character above described a cord slide for slideably receiving the cording and for locking the slide on the cording in any desired position.

Additional objects and advantages of the present invention will become obvious as this description proceeds, as will various modifications and changes which can be made to the structure of the present invention without departing from the spirit thereof. These additional objects, advantages, modifications and changes are intended to be covered by the scope of the appended claims.

BRIEF DESCRIPTION OF THE DRAWINGS

FIG. 1 is a top plan view of structure which embodies the present invention;

FIG. 2 is a side elevational view of the wristlet portion of the structure shown in FIG. 1 to show details of construction;

FIG. 3 is a view of the structure shown in FIG. 1 showing the manner in which the cording is attached to the wristlets and to the human wrists and knotted to accomplish the purpose of the invention;

DESCRIPTION OF THE PREFERRED EMBODIMENT

Figure 4:
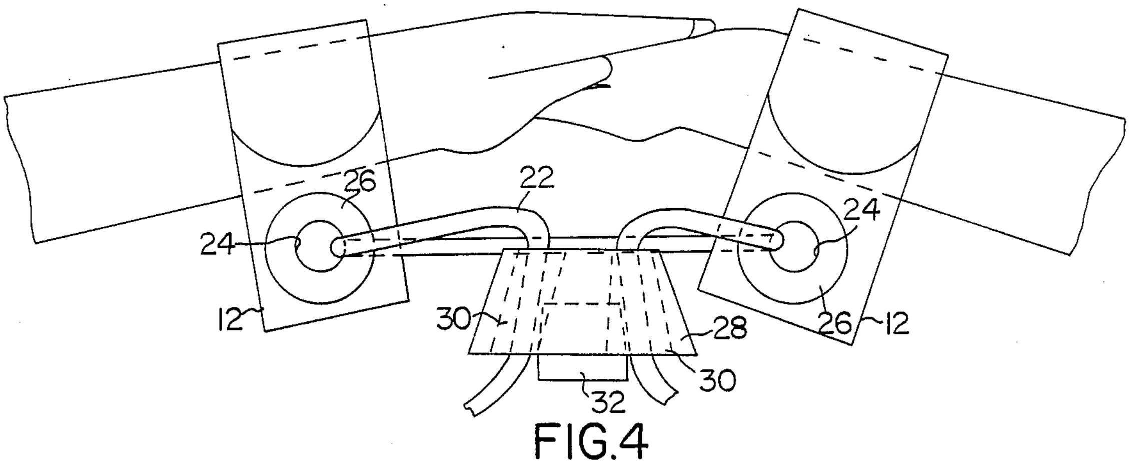
FIG. 4 is a second view similar to FIG. 3 showing the use of a cording securing and locking device to be used instead of a knot.

Referring now to the drawings and more particularly to FIGS. 1 and 2 thereof, a device is disclosed for selectively positioning a plurality of inert body parts which is generally identified by the numeral 10.

Device 10 includes a plurality of wraps each generally identified by the numeral 12. These wraps 12 may be of a pre-determined length and width to adapt them to encircle a wrist, ankle, arm or leg as may be desired but in any event they are elongated and generally rectangular in top or bottom plan view As viewed in FIG. 2, the wrap 12 has an upwardly facing surface 14 and a downwardly facing surface 16. Although it is discretionary with the maker, one of these surfaces must be provided with female joining material 18 which in this disclosure is on surface 14 and male joining material 20 which in this disclosure is on downwardly facing surface 16. Material 18 and 20 is generally known to the public under the tradename and mark VELCRO TM.

A brief reference to FIG. 3 of the drawings will disclose that a cord 22 is provided to be threaded through apertures 24 in the bands or wraps 12. Apertures 24 may be defined by grommets 26 to protect the wraps or bands 12 from tearing from the edges of the apertures 24.

Inert body parts such as the hands or feet of a body being embalmed may be secured in a desired relationship by threading the cord 22 through apertures 24 in a plurality of bands or wraps 12. The bands or wraps 12 may be called wristlets or anklets depending on their use but I have referred to them sometimes herein as wristlets as maintaining the hands of deceased obese persons in the serene or composed position is the most useful utility of the invention. If the hands of deceased obese persons are not so secured they can slide to the sides of the body due to gravity and movement of the casket and loved ones observing this may falsely believe the deceased is still alive.

When the exact desired relationship of the body parts such as the hands is obtained the cord 22 may be knotted to hold the desired position. When the body is covered by buttoned and properly placed clothing the device 10 is completely covered from view of a viewer.

In FIG. 4 a slide 28 is shown which allows the cording 22 to slide through channels 30 in slide 28. Slide 28 is further provided with a locking wedge 32 to fix the slide 28 relative to the cord 22 when the body parts are in the desired position. This structure was covered in U.S. Pat. No. 3,132,390.

Figure 5:
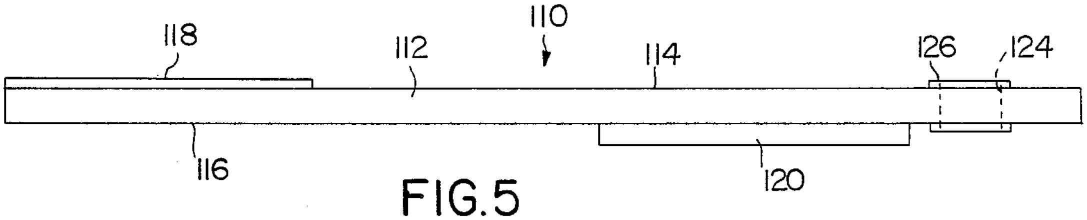
FIG. 5 shows a second embodiment of the wristlet which will accomplish the present invention in top plan.

In FIG. 5 a second embodiment of the present invention is shown with the same or similar structure identified by the same numbers in the 100 series. Note that in this structure the apertures 124 are defined by grommets 126 and are located adjacent one end of the wrap or band 112. This structure enables the manufacturer to produce the structure less expensively and to accomplish the same result.

I claim:

1. A device for securing a plurality of inert body parts in selected position relative to each other including:

(a) a pair of hands of elongated material, generally rectangular in plan view and having opposed faces;

(b) female joining means secured to one face of said material;

(c) male joining means secured to another face of said material for interconnection of the said faces;

(d) an aperture in each of said bands of material provided with an aperture defining marginal grommet;

(e) a securing cord threaded through the apertures such that the ends may be pulled to draw the bands and thus the body parts together when the bands are wrapped and joined male to female;

(f) a slide for the cording having a locking member, said slide having slide channels through which the cording may be fed and snugged to the desired body parts relationship after which the locking member may be manually axially, slideably positionable to lock and unlock the structure to position and adjust the body parts relationship in the desired positions relative to each other.

* * * * *